(12) United States Patent
Ishiguro et al.

(10) Patent No.: US 12,528,456 B2
(45) Date of Patent: Jan. 20, 2026

(54) PARKING ASSIST APPARATUS

(71) Applicant: TOYOTA JIDOSHA KABUSHIKI KAISHA, Aichi (JP)

(72) Inventors: Tatsuya Ishiguro, Toyota (JP); Takuya Nakagawa, Okazaki (JP); Yoshiki Hayakawa, Takahama (JP); Yohei Suzuki, Handa (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 66 days.

(21) Appl. No.: 18/530,206

(22) Filed: Dec. 6, 2023

(65) Prior Publication Data

US 2024/0262344 A1 Aug. 8, 2024

(30) Foreign Application Priority Data

Feb. 6, 2023 (JP) .................................. 2023-016186

(51) Int. Cl.
 *B60W 30/06* (2006.01)
(52) U.S. Cl.
 CPC ......... *B60W 30/06* (2013.01); *B60W 2554/20* (2020.02); *B60W 2554/80* (2020.02)
(58) Field of Classification Search
 CPC ............. B60W 30/06; B60W 2554/20; B60W 2554/80
See application file for complete search history.

(56) References Cited

U.S. PATENT DOCUMENTS

| | | | |
|---|---|---|---|
| 9,522,661 B2 | 12/2016 | Inoue et al. | |
| 9,604,638 B2 | 3/2017 | Kiyokawa et al. | |
| 9,738,276 B2 | 8/2017 | Kiyokawa et al. | |
| 9,828,028 B2 | 11/2017 | Ishijima et al. | |
| 9,836,658 B2 | 12/2017 | Kiyokawa et al. | |
| 9,875,655 B2 | 1/2018 | Kiyokawa et al. | |
| 10,031,227 B2 | 7/2018 | Kiyokawa et al. | |
| 10,150,486 B2 | 12/2018 | Hoshino et al. | |
| 10,239,520 B2 | 3/2019 | Tomozawa et al. | |
| 10,377,416 B2 | 8/2019 | Fukukawa et al. | |
| 2021/0300341 A1* | 9/2021 | Shoda | G06V 20/586 |

FOREIGN PATENT DOCUMENTS

| | | |
|---|---|---|
| JP | 2007-230502 A | 9/2007 |
| JP | 2008-296639 A | 12/2008 |
| JP | 2020-093575 A | 6/2020 |
| JP | 2021-160535 A | 10/2021 |
| JP | 2021-195054 A | 12/2021 |

\* cited by examiner

*Primary Examiner* — Daryl C Pope
(74) *Attorney, Agent, or Firm* — HAUPTMAN HAM, LLP

(57) ABSTRACT

The parking assist apparatus includes a parking assist ECU configured to be able to execute an automated parking control for parking the own vehicle in a target parking spot. The parking assist ECU calculates an estimated value of a width of an entrance of the target parking spots, detects the presence or absence of a getting-off obstacle that affects a space to get off from the own vehicle when the own vehicle is parked in the target parking spot, and executes the automated parking control when the getting-off obstacle is not detected and the estimated value of the width of the entrance is larger than a predetermined first threshold Hth1.

3 Claims, 6 Drawing Sheets

PARKING ASSIST APPARATUS

RELATED APPLICATIONS

The present application claims priority to Japanese Patent Application No. 2023-016186, filed Feb. 6, 2023, the disclosure of which is hereby incorporated by reference herein in its entirety.

TECHNICAL FIELD

The present disclosure relates to a parking assist apparatus.

BACKGROUND OF THE INVENTION

A parking assist apparatus is configured to be capable of executing automated parking control that performs at least some or all of the driving operations of an own vehicle to park the own vehicle in a parking spot. In relation to such a parking assist apparatus, standards such as ISO20900 (Partially automated parking systems: PAPS) and ISO16787 (Assisted parking systems: APS) are defined for a vehicle control related to the vehicle parking.

Patent Literature 1 discloses a parking assist apparatus capable of executing automated parking control. The parking assist apparatus disclosed in Patent Literature 1 is configured so that the own vehicle can be parked in a parking spot with a narrow space by executing the automated parking control.

[Patent Literature 1] JP 2021-195054 A

SUMMARY OF THE INVENTION

In a case where the own vehicle is parked in a parking spot with a narrow entrance, a space to get off is narrow, and it may be difficult to get off the own vehicle. In addition, when the own vehicle is parked in a parking spot that is difficult to get off due to a narrow getting-off space, the own vehicle needs to be moved out of the parking spot to search for another parking spot.

It is an object of the present disclosure to provide a parking assist apparatus capable of solving the above-described problem. In other words, it is an object of the present disclosure to provide a parking assist apparatus capable of parking an own vehicle in a parking spot with a narrow entrance while considering ease of getting off from the vehicle.

A parking assist apparatus according to the present disclosure includes a processor configured to execute an automated parking control for parking the own vehicle in a target parking spot. The processor is configured to estimate the width of the entrance of the target parking spot, to detect the presence or absence of an obstacle that affects a space to get off from the own vehicle when the own vehicle is parked in the target parking spot, and to execute the automated parking control when the obstacle is not detected and the estimated value of the width of the entrance is greater than a predetermined first threshold.

According to the parking assist apparatus of the present disclosure, it is possible to park the own vehicle in a parking spot with a narrow entrance by executing the automated parking control while securing a sufficient space to get off.

DESCRIPTION OF THE EMBODIMENT

Figure 1:
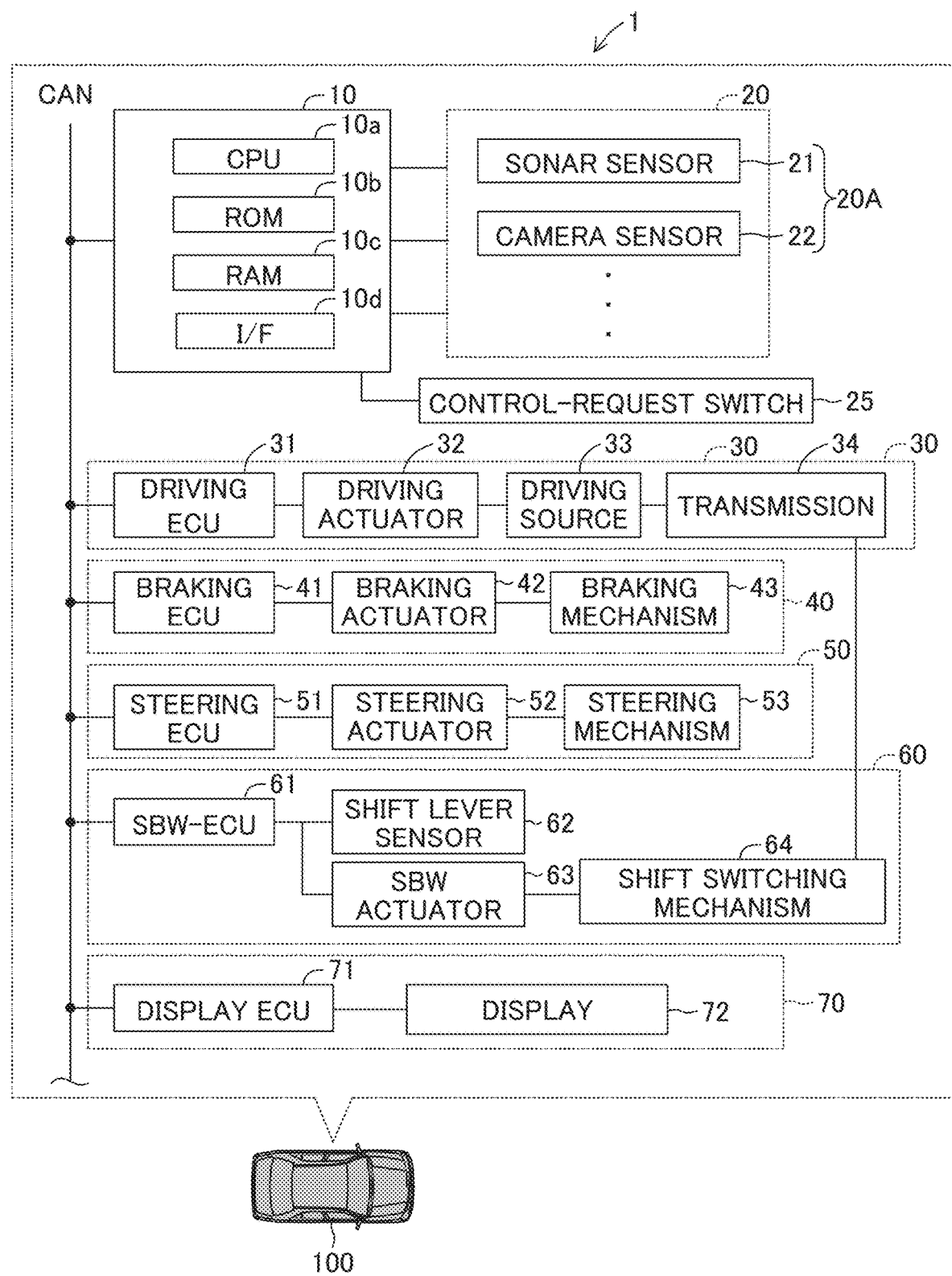
FIG. 1 is a block-diagram of a parking assist apparatus according to an embodiment of the present disclosure.

As illustrated in FIG. 1, a parking assist apparatus 1 according to an embodiment of the present disclosure is mounted on a vehicle 100 having an autonomous driving function. In the following, the vehicles 100 may be referred to as an own vehicle. That is, the parking assist apparatus 1 is mounted on the own vehicle.

The parking assist apparatus 1 includes a parking assist ECU 10, an on-vehicle sensor 20, a control-request switch 25, a driving device 30, a braking device 40, a steering device 50, a shift-switching device 60, and a displaying device 70. Note that "ECU" is an abbreviation of the Electronic Control Unit.

The parking assist ECU 10 includes, as a main configuration, a microcomputer including a CPU 10$a$, a ROM 10$b$, a RAM 10$c$ and an interface 10$d$. The parking assist ECU 10 is a control device configured such that the CPU 10$a$ executes various controls including automated parking control by executing instructions, programs, or routines stored in the ROM 10$b$.

The parking assist ECU 10 may be constructed by a plurality of ECUs. Further, the parking assist ECU 10 is connected to a plurality of other ECUs via a CAN(Controller Area Network). The parking assist ECU 10 may transmit and receive required information to and from the ECUs connected to each other.

The on-vehicle sensor 20 includes an peripheral information sensor 20A that obtains information regarding objects or displays that exists around the own vehicle. For example, the on-vehicle sensor 20 includes a sonar sensor 21 and a camera sensor 22 as the peripheral information sensor 20A.

The sonar sensor 21 intermittently radiates an ultrasonic wave to a peripheral area of the own vehicle and receives an ultrasonic wave (reflected wave) reflected by a three-dimensional object. The sonar sensor 21 calculates a distance between the own vehicle and the object, the relative position between the own vehicle and the object, and the like based on the time from the transmission of the ultrasonic wave to the reception of the reflected wave. The sonar sensor 21 transmits information indicating the calculated distance and relative position to the parking assist ECU 10. In the present embodiment, a plurality of sonar sensors 21 are provided in the own vehicle so that ultrasonic waves can be radiated to almost the entire circumference of the own vehicle.

The camera sensor 22 includes a camera device and an image analysis device. The camera device is, for example, a digital camera incorporating an image sensor constituted by CCD (charge coupled device) or CIS(CMOS image sensor). The camera device captures images of the peripheral area of the own vehicle at predetermined frame rates, and acquires the captured images. The camera device transmits each piece of image data to the image analysis device. The image analysis device analyzes the acquired image data to obtain information regarding the objects and displays present around the own vehicle. For example, the image analysis device recognizes shapes and colors of walls, fences, columns, and other vehicles that define the parking spots, parking frame lines displayed on the road surface, and the like. The image analysis device transmits information indicating the recognition result to the parking assist ECU 10 together with the image data. The camera sensor 22 has a plurality of camera devices so as to be able to photograph the entire periphery of the own vehicle.

The on-vehicle sensor 20 may include a radar sensor as the peripheral information sensor 20A. In addition, the on-vehicle sensor 20 may include a sensor other than the peripheral information sensor 20A. For example, the on-vehicle sensor 20 may include a vehicle speed sensor, a yaw rate sensor, a shift lever sensor 62 described later, and the like.

The control-request switch 25 is an operating device for requesting to park the own vehicle using the parking assist apparatus 1. The control-request switch 25 is mounted in a position in a cabin of the own vehicle where it is easy for the driver to operate. The parking assist ECU 10 detects an operating state (on/off state) of the control-request switch 25.

The driving device 30 includes a driving ECU 31, a driving actuator 32, a driving source 33, a transmission 34, and a driving force transmission mechanism (not shown) that transmits a driving force to the driving wheels. The driving ECU 31 is electrically connected to the driving actuator 32 such that the operation of the driving actuator 32 can be controlled. The driving actuator 32 adjusts the driving force generated by the driving source 33.

The driving ECU 31 controls the driving force generated by the driving source 33 by controlling the operation of the driving actuator 32. The driving force generated by the driving source 33 is transmitted to the driving wheels of the own vehicle via the transmission 34 and the driving force transmission mechanism. In addition, the parking assist ECU 10 can control the driving actuator 32 by transmitting a command signal to the driving ECU 31 while the automated parking control is being executed. The driving device 30 can also generate the driving force by operating an accelerator pedal provided in the own vehicle by the driver. The driving source 33 may be an internal combustion engine including an engine, an electric motor, or an internal combustion engine and an electric motor.

The braking device 40 includes a braking ECU 41, a braking actuator 42, and a braking mechanism 43. The braking ECU 41 is electrically connected to the braking actuator 42 such that the operation of the braking actuator 42 can be controlled. The braking actuator 42 may be a known hydraulic actuator including a hydraulic circuit. In this case, the braking actuator 42 is actuated to supply hydraulic pressure to the braking mechanism 43. The braking mechanism 43 is configured to apply a frictional braking force to the wheels by hydraulic pressure (i.e., braking pressure) supplied from the braking actuator 42. The own vehicle is braked by the frictional braking force generated by the braking mechanism 43.

The braking ECU 41 controls the braking force for braking the own vehicle by controlling the braking actuator 42 to adjust the hydraulic pressure (braking pressure) supplied to the braking mechanism 43. In addition, the parking assist ECU 10 can control the braking actuator 42 by transmitting a command signal to the braking ECU 41 while the automated parking control is being executed. The braking device 40 can also generate the braking force by operating a brake pedal provided in the own vehicle by the driver.

The steering device 50 includes a steering ECU 51, a steering actuator 52, and a steering mechanism 53. The steering mechanism 53 includes a steering wheel, a steering shaft, a steering gear box, tie rods, and the like. The steering mechanism 53 is configured to be able to steer the steered wheels by rotating the steering wheel. The steering actuator 52 is, for example, an electric motor. The steering actuator 52 is connected to the steering mechanism 53 so that the force for steering the steered wheels can be applied to the steering mechanism 53. The steering ECU 51 controls the steering angle of the steered wheels of the own vehicle by controlling the steering actuator 52. In addition, the parking assist ECU 10 can control the steering actuator 52 by transmitting a command signal to the steering ECU 51 while the automated parking control is being executed.

The shift switching device 60 switches a shift position (shift stage) of the transmission 34. The shift position includes a parking position, a neutral position, a forward position, and a backward position. The shift switching device 60 includes an SBW-ECU 61, a shift lever sensor 62, an SBW actuator 63, a shift switching device 64, and the like. Note that SBW is an abbreviation for shift-by-wire. The shift lever sensor 62 detects a position of the shift lever. The SBW-ECU 61 receives the position of the shift lever from the shift lever sensor 62. The SBW-ECU 61 controls the SBW actuator 63 based on the position of the shift lever. The SBW actuator 63 actuates the shift switching mechanisms 64 in response to an instruction from the SBW-ECU 61 to switch the shift position of the transmission 34 to one of a plurality of shift positions (parking position, neutral position, forward position and backward position). In addition, the parking assist ECU 10 can control the SBW actuator 63 via the SBW-ECU 61 by transmitting a command signal to the SBW-ECU 61 while the automated parking control is being executed.

The display device 70 includes a display ECU 71 and a display 72. The display ECU 71 is connected to the display 72 so that the display 72 can be controlled. The display 72 is provided, for example, in front of the driver's seat. The parking assist ECU 10 can control the display device 70 so as to display images indicating predetermined information on the display 72 by transmitting a command signal to the display ECU 71. When parking the own vehicle with using the parking assist apparatus 1 having the above configuration, the driver causes the own vehicle to stop at a position in the periphery of an entrance of a target parking spot.

After stopping the own vehicle at the position in the periphery of the entrance of the target parking spot, the driver operates the control-request switch 25 so that the control-request switch 25 is turned on. When the parking assist ECU 10 detects the on-state of the control-request switch 25, the parking assist ECU 10 executes area detection processing. In area detection processing, the parking assist ECU 10 acquires information regarding objects and displays existing around the own vehicle based on the information acquired from the sonar sensor 21 and the camera sensor 22.

Figure 2:
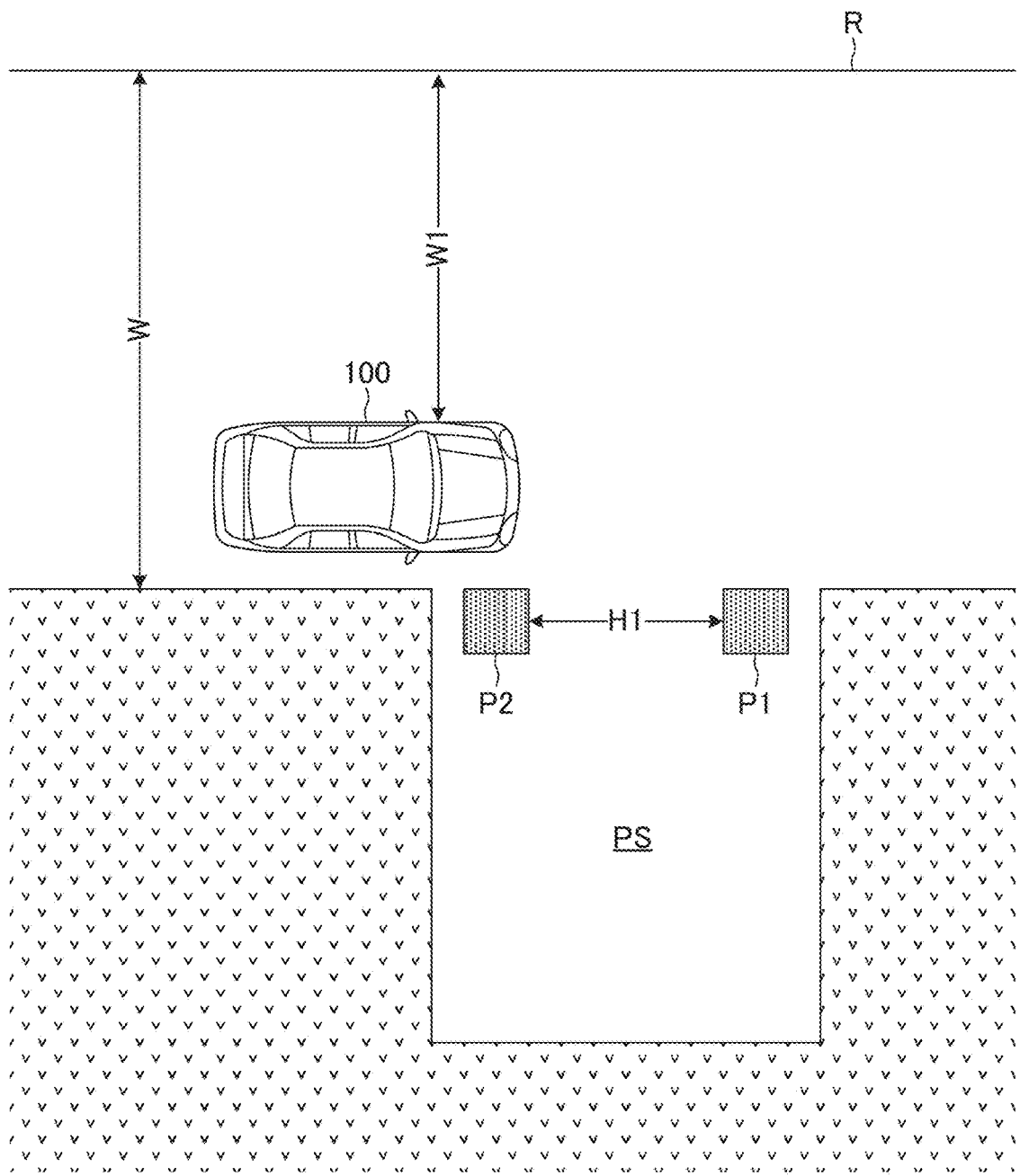
FIG. 2 is a schematic plan view illustrating an example of a target parking spot.

The parking assist ECU 10 then detects an area in which the own vehicle can be parked based on the objects and displays existing around the own vehicle. When detecting the area in which the own vehicle can be parked, the parking assist ECU 10 sets the detected area as a target parking spot. FIG. 2 is a schematic plan view illustrating an example of a target parking spot. The target parking spot PS shown in FIG. 2 is a rectangular area. The entrance of the target parking spot PS faces the road R. The width of this entrance is determined by the distance between the two columns P1, P2. In the case where the own vehicle is parked at the target parking spot PS shown in FIG. 2, the own vehicle passes through between the two columns P1, P2.

Figure 3:
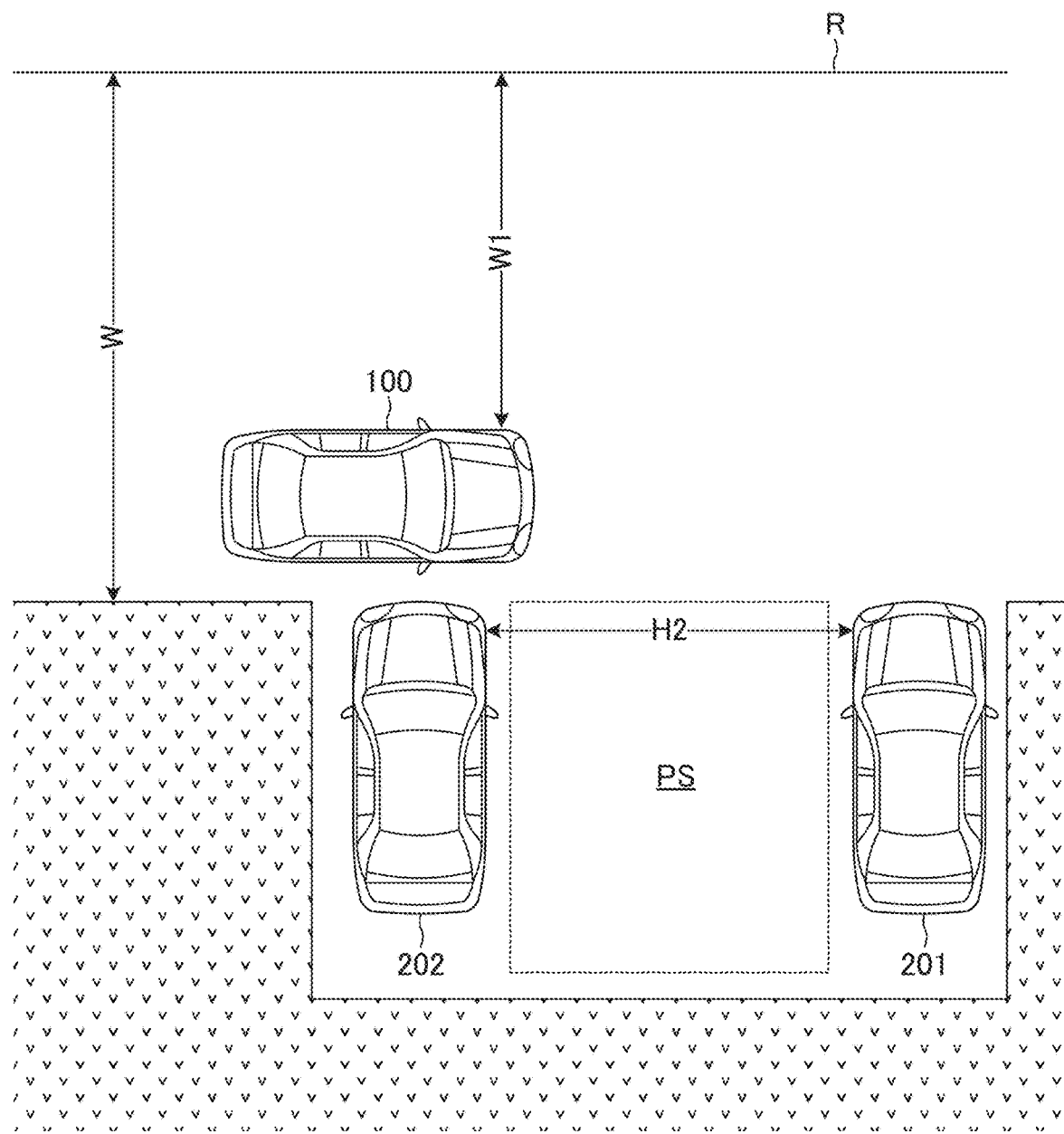
FIG. 3 is a schematic plan view illustrating another example of the target parking spot.

FIG. 3 is a schematic plan view illustrating another example of the target parking spot. The target parking spot PS illustrated in FIG. 3 is a rectangular area sandwiched between two other vehicles 201, 202. The entrance of the target parking spot PS faces the road R. The width of this entrance is determined by the distance between the two other vehicles 201, 202.

After setting the target parking spot, the parking assist ECU 10 detects the presence or absence of entrance defining objects which is two objects for determining the width of the entrance of the target parking spot. In the case where the target parking spot is the one shown in FIG. 2, the width of the entrance of the target parking spot PS is determined by the distance between the two columns P1 and P2. Therefore, the parking assist ECU 10 detects two columns P1, P2 as the entrance defining objects. Similarly, as shown in FIG. 3, the width of the entrance of the target parking spot PS is determined by the distance between the two other vehicles 201 and 202. Therefore, the parking assist ECU 10 detects two other vehicles 201, 202 as the entrance defining objects. On the other hand, in the case where the width of the entrance of the target parking spot is determined by the distance between two parking frame lines drawn on the road surface, the width of the entrance of the target parking spot is not determined by the distance between the objects. In this case, the parking assist ECU 10 does not detect the entrance defining objects.

When detecting the entrance defining objects, the parking assist ECU 10 calculates an estimated value of the distance between two objects detected as the entrance defining objects. The calculated value is an estimated value of the width of the entrance of the target parking spot. In the embodiment shown in FIG. 2, the parking assist ECU 10 calculates an estimated value H1 of the distance between the two columns P1 and P2 as the estimated value of the width of the entrance of the target parking spot PS. In the embodiment shown in FIG. 3, the parking assist ECU 10 calculates an estimated value H2 of the distance between the two other vehicles 201 and 202 as the estimated value of the width of the entrance of the target parking spot PS.

Next, the parking assist ECU 10 determines whether or not the entrance defining objects are getting-off obstacles. The getting-off obstacle is an object that may affect the getting-off space of the own vehicle parked in the target parking spot. More precisely, the getting-off obstacle is an object whose presence may narrow the getting-off space of the own vehicle parked in the target parking spot. Specifically, the getting-off obstacle is an object that may contact a getting-off door which opens when an occupant of the own vehicle parked in the target parking spot gets off. For example, an object adjacent to the getting-off door in a vehicle width direction of the own vehicle parked in the target parking spot may contact the getting-off door when the getting-off door is opened. Thus, such an object is the getting-off obstacle. Note that the getting-off space is a space for getting off from the own vehicle. More specifically, the getting-off space is a space that an occupant who gets off from the own vehicle can occupy when getting off.

In the example illustrated in FIG. 2, the parking assist ECU 10 determines whether or not the two columns P1, P2 are getting-off obstacles. As can be seen from FIG. 2, the two columns P1, P2 are present only in the vicinity of the entrance of the target parking spot PS. Therefore, when the own vehicle is parked in the target parking spot PS, the columns P1, P2 are not disposed adjacently to the door (side door) for getting off. Accordingly, the columns P1, P2 are not getting-off obstacles.

In the example illustrated in FIG. 3, the parking assist ECU 10 determines whether or not the two other vehicles 201, 202 are getting-off obstacles. Here, the two other vehicles 201, 202 extend in the depth direction from the entrance of the target parking spot PS. Therefore, when the own vehicle is parked in the target parking spot PS, the other vehicle 201,202 is disposed adjacently to the door (side door) for getting off in the vehicle width direction. Accordingly, the other vehicles 201,202 are getting-off obstacles.

In the present embodiment, the parking assist ECU 10 stores in advance objects as getting-off obstacles. For example, another vehicle, a wall, or the like is stored in advance as the getting-off obstacle. Then, the parking assist ECU 10 compares the stored objects with the entrance defining objects to determine whether or not the entrance defining objects are the getting-off obstacles.

If the entrance defining objects are not the getting-off obstacles, the entrance defining objects do not narrow the getting-off space when the own vehicle is parked in the target parking spot. Therefore, even when the distance between the two objects defining the entrance (i.e., the entrance of the target parking spot) is relatively narrow, it is possible to secure a sufficiently large getting-off space when the occupant gets off from the own vehicle parked in the target parking spot. In this case, the parking assist ECU 10 determines whether or not the estimated value of the width of the entrance of the target parking spot PS is larger than a first threshold Hth1 set in advance as the width of the relatively narrow entrance. The first threshold Hth1 may be set in advance as a lower limit value of the width of the entrance through which the own vehicle can safely pass by executing the automated parking control. For example, the first threshold Hth1 may be set to a value obtained by adding a length of the order of 20 cm to the width of the own vehicle.

On the other hand, if the entrance definition objects are the getting-off obstacles, the entrance definition objects may narrow the getting-off space when the own vehicle is parked in the target parking spot. Therefore, when the distance between the two objects defining the entrance (i.e., the entrance of the target parking spot) is not wide, it is not possible to secure a sufficiently large getting-off space when the occupant gets off from the own vehicle parked in the target parking spot. In this case, the parking assist ECU 10 determines whether or not the estimated value of the width of the entrance of the target parking spot PS is larger than a second threshold Hth2 set in advance as the width of the relatively wide entrance. The second threshold Hth2 is set to be larger than the first threshold Hth1. Further, the second threshold Hth2 is set to a value so as to secure a sufficient large getting-off space when the own vehicle is parked. For example, the second threshold Hth2 may be set to a value obtained by adding a length of the order of 100 cm to the vehicle width of the own vehicle.

The parking assist ECU 10 starts executing the automated parking control when the entrance defining objects are not the getting-off obstacles and the estimated value of the width of the entrance is larger than the first threshold Hth1. For example, as shown in FIG. 2, when the entrance defining objects are two columns P1, P2 and the estimated value H1 is larger than the first threshold Hth1, the automated parking control is started to be executed.

The parking assist ECU 10 starts executing the automated parking control when the entrance defining objects are the getting-off obstacles and the estimated value of the width of the entrance is larger than the second threshold Hth2. For example, as shown in FIG. 3, when the entrance defining object is two other vehicles 201,202 and the estimated value H2 is larger than the second threshold Hth2, the automated parking control is started to be executed.

Figure 4:
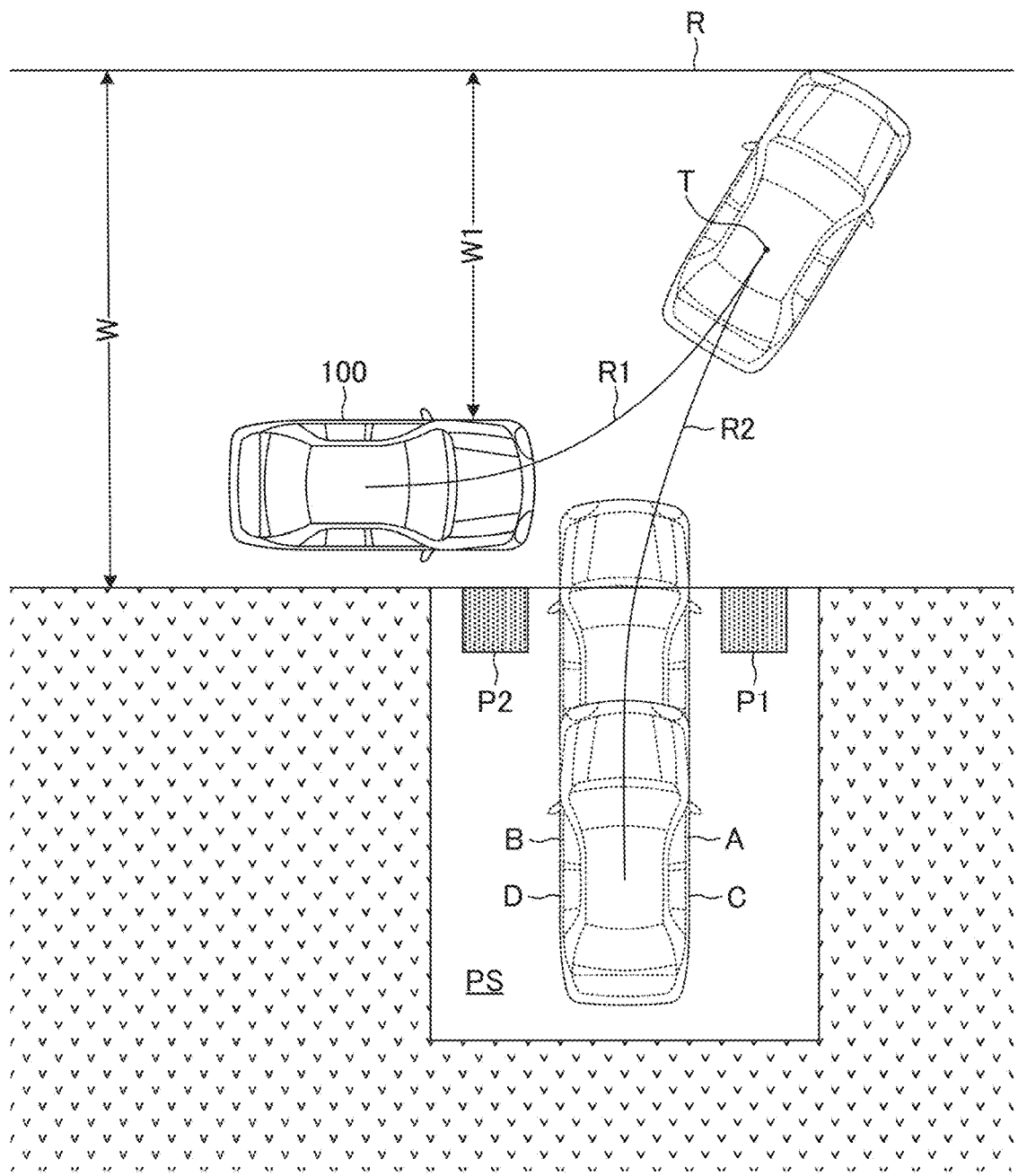
FIG. 4 is a diagram illustrating a parking operation of the own vehicle parked in the target parking spot illustrated in FIG. 2 by the automated parking control.
Figure 5:
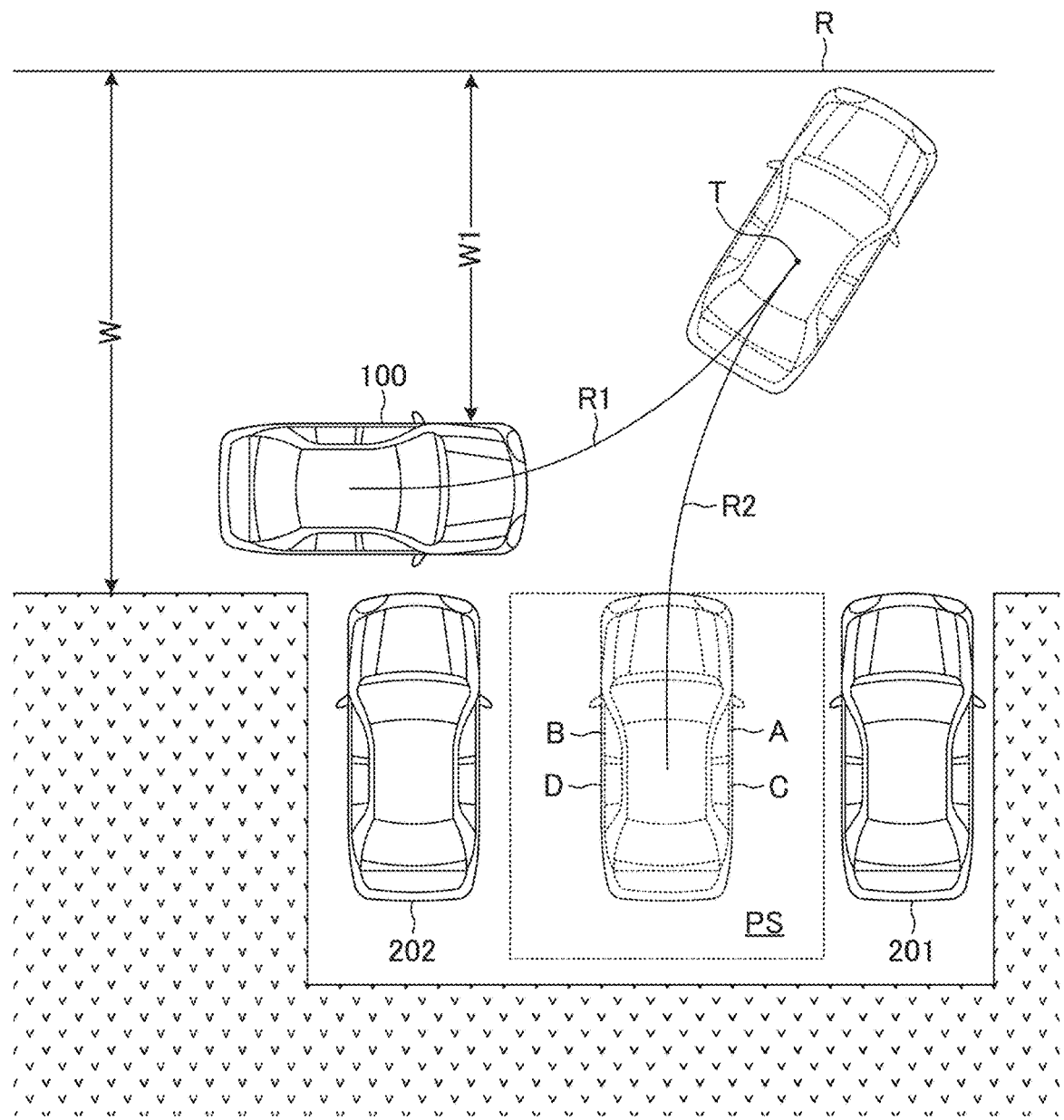
FIG. 5 is a diagram illustrating a parking operation of the own vehicle parked in the target parking spot illustrated in FIG. 3 by the automated parking control.

FIG. 4 is a diagram illustrating a parking operation of the own vehicle parked in the target parking spot PS illustrated in FIG. 2 by executing the automated parking control. FIG. 5 is a diagram showing a parking operation of the own vehicle parked in the target parking spot PS shown in FIG. 3 by executing the automated parking control. As shown in FIGS. 4 and 5, the own vehicle moves forward from the stop position along the first route R1 and stops at the turning position T once. The own vehicle then moves backward along the second route R2 from the turning position T. The own vehicle stops at a predetermined target parking position in the target parking spot PS to complete the parking.

As shown in FIG. 4, the own vehicle passes through the entrance defined by the two columns P1, P2 when moving backward along the second route R2 by executing the automated parking control. The width of the entrance is narrow and the distance between the two columns P1, P2 and the own vehicle is small. However, the two columns P1, P2 are not adjacent to the getting-off door (side door A, B, C, D) for getting off from the own vehicle parked at the predetermined target parking position in the target parking spot PS. Therefore, the getting-off space is not narrowed by the two columns P1, P2. Accordingly, it is possible to secure a sufficiently large getting-off space. That is, according to the parking assist apparatus 1 of the present embodiment, it is possible to park the own vehicle in a parking spot having a narrower entrance by executing the automated parking control while securing a sufficiently large getting-off space.

As shown in FIG. 5, the two other vehicles 201, 202 are adjacent to the getting off door (side door A, B, C, D) for getting off from the own vehicle parked at a predetermined target parking position in the target parking spot PS. However, since the width of the entrance of the target parking spot PS shown in FIG. 5 is larger than the second threshold Hth2 set as the width of the relatively wide entrance, the distance between the getting-off door of the own vehicle parked at the target parking position and the other vehicle 201, 202 is also sufficiently wide. Therefore, according to the parking assist apparatus 1 of the present embodiment, it is possible to secure a sufficiently large getting-off space even when the getting-off obstacles exist.

When the entrance defining objects are not the getting-off obstacle and the estimated value of the width of the entrance is equal to or smaller than the first threshold Hth1, the parking assist ECU 10 determines that the own vehicle may contact two objects that define the width of the entrance when the automated parking control is executed because the width of the entrance of the target parking spot is too narrow. Therefore, the parking assist ECU 10 does not execute the automated parking control.

When the entrance defining objects are the getting-off obstacles and the estimated value of the width of the entrance is equal to or smaller than the second threshold Hth2, the parking assist ECU 10 determines that the getting-off space for the occupant who gets off from the own vehicle parked at the predetermined position in the target parking spot is narrow. Therefore, the parking assist ECU 10 does not execute the automated parking control.

The parking assist ECU 10 may determine whether or not a parking operation area width W is larger than the threshold width Wth when executing the automated parking control. Here, the parking operation area width W is an estimated value of the width of the road on which the own vehicle moves to park the own vehicle in the target parking spot. For example, as illustrated in FIGS. 2 and 3, the estimated width W of the road R facing the entrance of the target parking spot PS is the parking operation area width. Instead of the width W of the road R, the estimated value of the length W1 from the own vehicle (the vehicle 100) to the end of the road R opposite to the target parking spot may be used as the parking operation area width. The parking assist ECU 10 may estimate the width W or the length W1 based on information detected by the sonar sensor 21 of the own vehicle.

When the parking operation area width W is small, the own vehicle cannot perform the parking operation for parking the own vehicle in the target parking spot. For example, if the parking operation area width W is small, an operation for moving forward the own vehicle to the turning position T as shown in FIGS. 4 and 5 can not be performed. Therefore, the parking assist ECU 10 compares the parking operation area width W with the predetermined threshold width Wth. When the parking operation area width W is equal to or smaller than the threshold width Wth, the parking assist ECU 10 does not execute the automated parking control. On the other hand, the parking assist ECU 10 executes the automated parking control when the parking operation area width W is larger than the threshold width Wth. The threshold width Wth may be preset as a lower limit value of a width in which the own vehicle may perform a parking operation.

Figure 6:
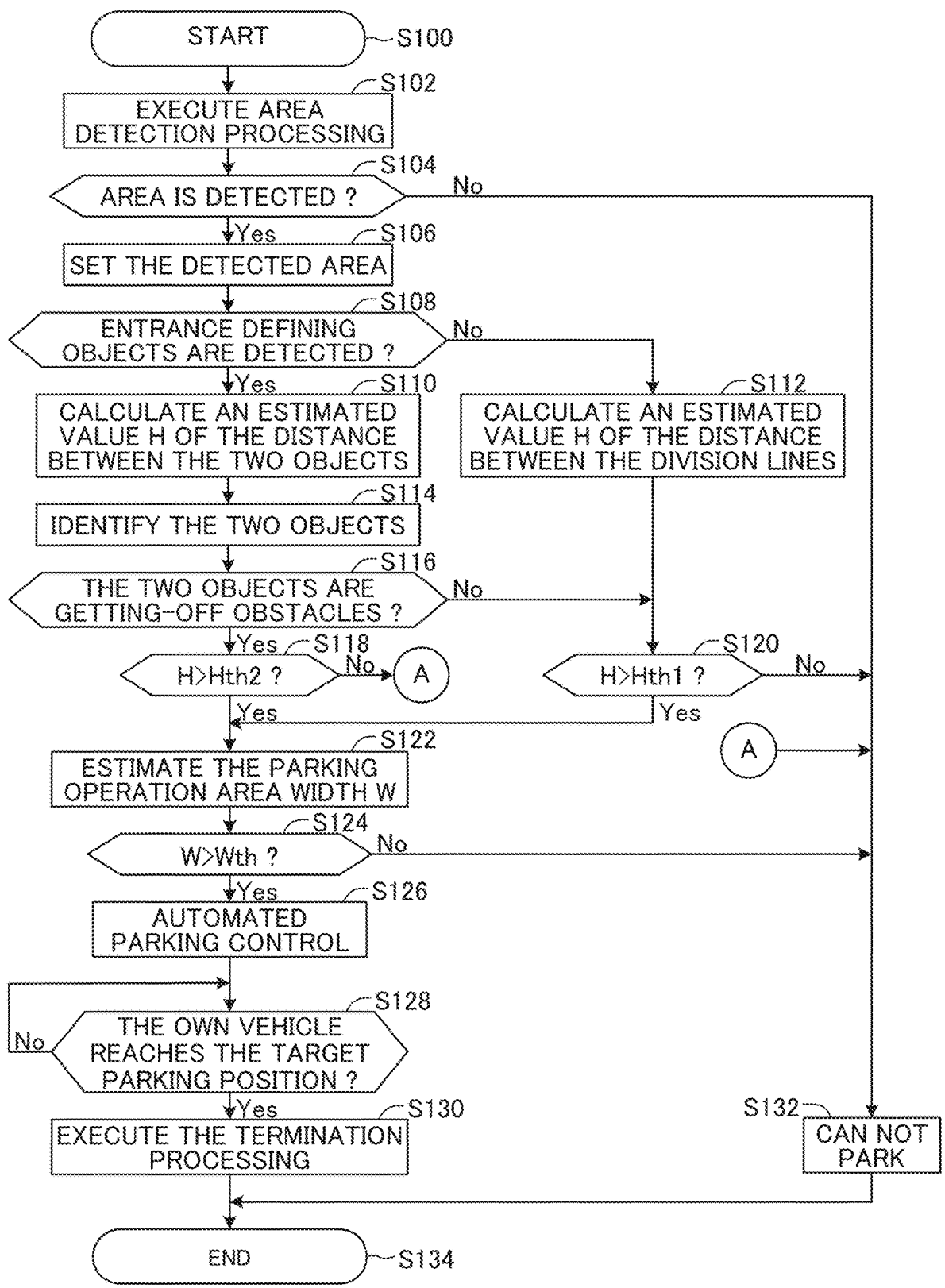
FIG. 6 is a flow chart showing a routine executed by CPU of the parking assist ECU to execute the automated parking control.

FIG. 6 is a flow chart showing a routine executed by a CPU 10a (hereinafter referred to as a CPU) of the parking assist ECU 10 to execute the above-described automated parking control. This routine is activated when the control-request switch 25 is pressed. When this routine is started, the CPU starts this routine from step 100 (hereinafter, step is abbreviated as S) and process proceeds to S102.

The CPU executes area detection processing in S102. The CPU determines whether or not an area in which the own vehicle can be parked is detected in S104. When the area in which the own vehicle can be parked is not detected (S104: No), the process proceeds to S132. In S132, the CPU controls the display device 70 so that an image indicating that the own vehicle can not be parked because the area in which the own vehicle is parked cannot be detected are displayed on the display 72. After that, the process proceeds to S134 to end this routine without executing the automated parking control.

When the area in which the own vehicle can be parked is detected (S104:Yes), the process proceeds to S106. In S106, the CPU sets the detected area as the target parking spot. At this time, the CPU recognizes the entrance of the set target parking spot. Then, the CPU determines whether or not the entrance defining objects are detected in S108. In this case, the CPU determines whether or not objects are present at both ends of the recognized entrance based on the image data and the recognition information acquired from the camera sensor 22. When objects are present at both ends of the recognized entrance, the CPU determines that entrance defining objects are detected.

When the entrance defining objects are not detected (S108:No), the process proceeds to S112. Here, When the entrance defining objects do not exist, the entrance of the target parking spot is defined by division lines such as parking frame lines drawn on the road surface. Therefore, in S112, the CPU calculates an estimated value H of the distance between the division lines for defining the entrance. After that, the process proceeds to S120.

When the entrance defining objects are detected (S108: Yes), the process proceeds to S110. In S110, the CPU calculates an estimated value H of the distance between the two objects detected as the entrance defining objects. Then the process proceeds to S114. In S114, the CPU identifies the two objects that are detected as the entrance defining objects. In this case, the CPU can identify two objects based on the image data and the recognition information regarding the entrance defining objects acquired from the camera sensor 22. After identifying the two objects, the process proceeds to S116.

In S116, the CPU determines whether the two identified objects are getting-off obstacles. In this case, the CPU determines whether the two identified objects correspond to one of the plurality of stored getting-off obstacles. If the two identified objects are not getting-off obstacles (S116:No), the process proceeds to S120. If the two identified objects are getting-off obstacles (S116:Yes), the process proceeds to S118.

In S120, the CPU determines whether the estimated value H is larger than the first threshold Hth1 that is predetermined value as the width of the relatively narrow entrance. When the estimated value H is less than or equal to the first threshold Hth1 (S120:No), the CPU determines that the entrance of the target parking spot is too narrow. In this case, the process proceeds to S132. In S132, the CPU controls the display device 70 so that an image indicating that the own vehicle can not be parked in the target parking spots due to the narrow entrance are displayed on the display 72. After that, the process proceeds to S134 to end this routine without executing the automated parking control.

In S118, the CPU determines whether or not the estimated value H is larger than the second threshold Hth2 determined in advance as the width of the relatively wide entrance. When the estimated value H is equal to or less than the second threshold Hth2 (S118:No), the CPU determines that the getting-off space is small when the own vehicle is parked in the target parking spot. In this case, the process proceeds to S132. In S132, the CPU controls the display device 70 so that an image indicating that the own vehicle cannot be parked in the target parking spot due to the narrow getting-off space are displayed on the display 72. After that, the process proceeds to S134 to end this routine without executing the automated parking control.

In S120, when determining that the estimated value H is larger than the first threshold Hth1 (S120:Yes), the process proceeds to S122. In S118, when determining that the estimated value H is larger than the second threshold Hth2 (S118:Yes), the process proceeds to S122. In S122, the CPU estimates the parking operation area width W. Then, the process proceeds to S124. In S124, the CPU determines whether or not the parking operation area width W is larger than the threshold width Wth. When the parking operation area width W is equal to or smaller than the threshold width Wth (S124:No), the CPU determines that the area where the own vehicle performs the parking operation is smaller in order to park the own vehicle in the target parking spot. In this case, the process proceeds to S132. In S132, the CPU controls the display device 70 so that an image indicating that the parking operation for parking the own vehicle in the parking spot cannot be performed is displayed on the display 72. After that, the process proceeds to S134 to end this routine without executing the automated parking control.

When the CPU determines that the parking operation area width W is larger than the threshold width Wth (S124:Yes), the process proceeds to S126. In S126, the CPU starts executing the automated parking control. When the automated parking control is started to be executed, the CPU controls the driving device 30, the braking device 40, the steering device 50, and the shifting device 60 of the own vehicle so that the own vehicle is parked at the predetermined target parking position in the target parking spot. After that, the process proceeds to S128. In S128, the CPU determines whether the own vehicle has reached the predetermined target parking position in the target parking spot. When the own vehicle has not reached the target parking position (S128:No), the CPU repeats the process of S128. On the other hand, when the own vehicle has reached the target parking position (S128:Yes), the process proceeds to S130. In S130, the CPU executes the predetermined termination processing. After that, the process proceeds to S134 to end this routine.

As described above, the parking assist ECU 10 of the parking assist apparatus 1 according to the present embodiment calculates the estimated value of the width of the entrance of the target parking spot (S110), detects presence or absence of the getting off obstacle that affects the getting off space when the own vehicle is parked in the target parking spot (S116), and executes the automated parking control when the getting off obstacle is not detected (S116:No) and the estimated value of the width of the entrance is larger than the first threshold Hth1 (S120:Yes) (S126).

Specifically, the parking assist ECU 10 calculates the estimated value of the distance between two objects as the estimated value of the width of the entrance when the width of the entrance of the target parking spots is defined by the distance between the two objects (S110). The parking assist ECU 10 detects whether or not the two objects defining the entrance (the entrance defining objects) are the getting off obstacles (S116). Then, the parking assist ECU 10 executes the automated parking control (S126) when the entrance defining objects are not the getting off obstacles (S116:No) and the estimated value of the width of the entrance is larger than the first threshold Hth1 (S120:Yes), which is set as the width of the relatively narrow entrance.

According to the present embodiment, when the entrance defining objects do not affect the getting-off space of the own vehicle parked in the target parking spot, that is, when the entrance defining objects are not the getting-off obstacles, the automated parking control is executed for the target parking spot having a relatively narrow entrance. In this case, since the entrance defining objects do not affect the getting-off space, it is possible to secure the sufficiently large getting off space as shown in FIG. 2, even when the own vehicle is parked in the parking spot having a relatively narrow entrance by the automated parking control. In other words, according to the parking assist apparatus 1 of the present embodiment, it is possible to park the own vehicle in the parking spot having a narrower entrance by the automated parking control while considering the ease of getting off from the own vehicle (i.e., while securing the sufficiently large getting-off space).

In addition, the parking assist ECU 10 does not execute the automated parking control when the entrance defining objects are not getting-off obstacles (S116:No) and the estimated value of the width of the entrance is equal to or smaller than the first threshold Hth1 (S120:No) (S132). According to this configuration, it is possible to prevent a problem caused by parking the own vehicle in the parking spot where the entrance is too narrow. For example, it is possible to prevent the own vehicle from contacting the entrance defining objects.

Further, the parking assist ECU 10 executes the automated parking control when the entrance defining objects are the getting off obstacles (S116:Yes) and the estimated value of the width of the entrance is larger than the second threshold Hth2 predetermined as the value larger than the first threshold Hth1 (S118:Yes).

According to this configuration, when the entrance defining objects are the getting off obstacle, the automated parking control is not executed unless the width of the entrance is relatively wide. That is, in the case where the automated parking control is executed when the entrance defining objects are the getting-off obstacles, the entrance of the target parking spot is wide. Therefore, even if the entrance defining objects are the getting-off obstacle, a sufficient large getting off space can be secured as shown in FIG. 4.

In addition, the parking assist ECU 10 does not execute the automated parking control (S132) when the entrance defining objects are the getting off obstacles (S116:Yes) and the estimated value of the width of the entrance is equal to or smaller than the second threshold Hth2 (S118:No). According to this configuration, it is possible to prevent the own vehicle from being parked in the parking spot where the getting off space is narrow by the automated parking control.

The disclosed technology can be applied to a technology compliant with ISO20900 (Partially automated parking systems: PAPS) or ISO16787 (Assisted parking systems: APS).

What is claimed is:

1. A parking assist apparatus comprising a processor which executes an automated parking control for parking an own vehicle in a target parking spot, wherein the processor is configured to:

calculate a distance between two entrance defining objects as an estimated value of a width of an entrance of the target parking spot when the width of the entrance of the target parking spot is defined by the distance between the two entrance defining objects;

detect whether or not the two entrance defining objects are getting-off obstacles that affect a space to get off from the own vehicle when the own vehicle is parked in the target parking spot;

execute the automated parking control when the two entrance defining objects are not the getting-off obstacles and the estimated value of the width of the entrance is larger than a predetermined first threshold; and execute the automated parking control when the two entrance defining objects are the getting-off obstacles and the estimated value of the width of the entrance is larger than a second threshold predetermined as a value larger than the first threshold.

2. The parking assist apparatus according to claim 1, wherein the processor does not execute the automated parking control when the two entrance defining objects are not getting-off obstacles and the estimated value of the width of the entrance is equal to or smaller than the first threshold.

3. The parking assist apparatus according to claim 1, wherein the processor does not execute the automated parking control when the two entrance defining objects are the getting-off obstacles and the estimated value of the width of the entrance is equal to or smaller than the second threshold.

\* \* \* \* \*